United States Patent
Linder et al.

(10) Patent No.: US 12,163,039 B2
(45) Date of Patent: Dec. 10, 2024

(54) ROOM TEMPERATURE METHOD FOR THE PRODUCTION OF INORGANIC ELECTROTECHNICAL THIN LAYERS AND A THIN LAYER HEATING SYSTEM OBTAINED IN THIS MANNER

(71) Applicant: DYNAMIC SOLAR SYSTEMS AG, Frankfurt (DE)

(72) Inventors: Patrick Linder, Lehrberg (DE); Daniel Linder, Lehrberg (DE)

(73) Assignee: DYNAMIC SOLAR SYSTEMS AG, Frankfurt (DE)

( * ) Notice: Subject to any disclaimer, the term of this patent is extended or adjusted under 35 U.S.C. 154(b) by 0 days.

(21) Appl. No.: 17/009,890

(22) Filed: Sep. 2, 2020

(65) Prior Publication Data

US 2020/0399494 A1 Dec. 24, 2020

Related U.S. Application Data

(63) Continuation-in-part of application No. 15/554,070, filed as application No. PCT/DE2016/100085 on Feb. 26, 2016, now abandoned.

(30) Foreign Application Priority Data

Feb. 26, 2015 (DE) ...................... 10 2015 102 801.8
Dec. 2, 2015 (DE) ...................... 10 2015 015 435.4

(51) Int. Cl.
*C23C 18/00* (2006.01)
*B41M 7/00* (2006.01)
(Continued)

(52) U.S. Cl.
CPC ........... *C09D 11/52* (2013.01); *B41M 7/0045* (2013.01); *C09D 11/037* (2013.01); *H05B 3/34* (2013.01);
(Continued)

(58) Field of Classification Search
CPC .............................. H01L 21/00; C23C 18/00
See application file for complete search history.

(56) References Cited

U.S. PATENT DOCUMENTS

| | | | |
|---|---|---|---|
| 2005/0205860 A1* | 9/2005 | Hsu ..................... | G11C 13/0014 257/40 |
| 2006/0159838 A1* | 7/2006 | Kowalski ............. | H05K 3/1208 427/58 |

(Continued)

FOREIGN PATENT DOCUMENTS

| CN | 101243735 A | 8/2008 |
|---|---|---|
| DE | 102012107100 A1 | 2/2014 |

(Continued)

OTHER PUBLICATIONS

Notice of Reasons for Refusal for Japanese Application No. 2021-110448 dated Nov. 16, 2021.

(Continued)

*Primary Examiner* — Kelly M Gambetta
*Assistant Examiner* — Mohammad Mayy
(74) *Attorney, Agent, or Firm* — Tarolli, Sundheim, Covell & Tummino LLP

(57) ABSTRACT

Electrotechnical thin layers usable as heating resistance and/or substrate for conductor layers are produced at high cost and extremely slowly in the established methods. Industrial-scale methods that provide sufficient speed at room temperature are not available.

This problem is solved by a room temperature printing process, wherein a redox-reactively deposited, graphite-containing base layer printed at room temperature is obtained, onto which a metal, by redox reaction during print, forms a metal layer in the micrometer scale within minutes to a few seconds in a corresponding manner.

(Continued)

The double layer thus obtainable in one printing process is highly flexible, allows soldering to copper layers, and can be used particularly advantageously as a thin-layer heater.

10 Claims, 1 Drawing Sheet

(51) Int. Cl.
  *C09D 11/037* (2014.01)
  *C09D 11/52* (2014.01)
  *H05B 3/34* (2006.01)

(52) U.S. Cl.
  CPC .. *H05B 2203/013* (2013.01); *H05B 2203/017* (2013.01)

(56) References Cited

U.S. PATENT DOCUMENTS

| | | | |
|---|---|---|---|
| 2007/0144305 A1* | 6/2007 | Jablonski | B22F 1/102 75/252 |
| 2010/0136252 A1 | 6/2010 | Kohnle et al. | |
| 2015/0075598 A1* | 3/2015 | Hekmatshoartabari | H01L 31/074 136/256 |

FOREIGN PATENT DOCUMENTS

| | | |
|---|---|---|
| EP | 0726337 A1 | 8/1996 |
| JP | H08246188 A | 9/1996 |
| JP | 2009505383 A | 2/2009 |
| WO | 2007017192 A1 | 2/2007 |
| WO | 2016134705 A1 | 9/2016 |

OTHER PUBLICATIONS

A communication of EP 16723637.1 dated May 29, 2018.
A communication of EP 16723637.1 dated Jun. 9, 2020.
First Office Action of the CN 201680023248.7 dated Jul. 3, 2019.
Notice of Reasons for Refusal of JP 2017-545659 dated Mar. 17, 2020.

* cited by examiner

ROOM TEMPERATURE METHOD FOR THE PRODUCTION OF INORGANIC ELECTROTECHNICAL THIN LAYERS AND A THIN LAYER HEATING SYSTEM OBTAINED IN THIS MANNER

TECHNICAL FIELD

The present invention can generally be assigned to the field of electrotechnical thin layers. The technical field is sensibly defined in DE 10 2015 102 801, also published as WO 2016 134 706 A1, in which the inventors were involved. Known measures, features and methods can be taken from this application and the prior art cited therein.

DESCRIPTION OF THE PRIOR ART

The present invention relates to methods of producing electrotechnical thin layers, especially electrotechnical layer sequences, which are usable as conductor layers and can be utilized for contacting of thin-layer heaters.

The subject matter claimed in the present context has been discovered in the context of the production of a thin-layer heater.

It has been known since 1921 from DE 390 400 A that heating resistors can be produced as a mixture of waterglass, graphite and various salts by preparatory precipitation, spreading and drying. Correspondingly, DE 410 375 A teaches physical drying of such a layer, which is finally surface-conditioned with acid. A disadvantage in these established processes is that the process of drying the dispersion is purely physical and hence takes a very long time.

As an alternative, DE 839 396 B teaches encapsulating a heating wire in a quartz glass shell in order thus to obtain a durable thermal radiator. This design disadvantageously requires the incorporation of the wire in pure quartz glass by melting at high to very high temperatures. Alternative composite bodies as disclosed in DE 1 446 978 A also require high temperatures in order to produce a dense Si—SiC—C composite body as solid-state heating element.

Alternative designs which, as described in DD 266 693 A1, arrange graphite and further additions as a loose bed between two electrodes also disadvantageously envisage a large-volume arrangement of suitable material pairs. DE 196 479 35 B4 also teaches application of a mixture of graphite, carbon and/or carbon fiber blended with waterglass in a thick layer between electrodes. This too harbours the disadvantage that the electrodes can be attacked by the aggressive waterglass and therefore have to be executed with sufficient thickness. By contrast with what has been described above, the present invention is different in that it is located in the sector of thin films.

DE 3 650 278 T2, which is correspondingly directed to a thin heating film, is much more relevant by comparison. However, this document again disadvantageously teaches the carbonization of a polymer film, which requires a large amount of energy, it being necessary to convert said film to a graphite film by conversion at 1800° C.

It was therefore an object of the present invention to overcome the disadvantages of the prior art and to provide a method and an electrotechnical thin layer in accordance with the method, which, in spite of industrial processing at room temperature and with large-area fabrication, can offer thin layers that are solid, stable, preferably usable as a heating layer, and nevertheless modifiable with sufficient conductivity in terms of their electrotechnical properties for thin-layer contact connection.

This object is achieved in accordance with the features of the independent claims. Advantageous embodiments will be apparent from the dependent claims and the description which follows.

SUMMARY OF THE INVENTION

The invention provides a room temperature method of producing electrotechnical thin layers, by providing electrically conductive and/or semiconductive, inorganic agglomerates in a dispersion over an area and curing them to form a layer, characterized in that the curing is conducted at room temperature and the curing is accelerated by contacting with at least one reagent. In detail the room temperature method of producing inorganic, electrotechnical thin layers has a set of characterising measures and features. To begin with, the method is directed at printing a1) electrically conductive inorganic agglomerates and/or a2) electrically semiconductive inorganic agglomerates. The printing is done b) in an industrial printing machine. The method is of industrial scale. Agglomerates, i.e. particles or associated buidling blocks of inorganic prefabs, are printed c) as a dispersion. Printing places said dispersion d) into predefined regions within an area. The industrial-scale printing happens on the surface of e) of a flexible carrier; an established, flexible carrier being for example paper and its alternatives directly known to the experienced printer-technician. After placing the dispersion in the predefined area the dispersion will adhere/dry, i. e. f1) via curing the printed dispersion forms at least a stabilizing marginal shell. As this is a room temperature process, curing' happens without raise of temperature; any thermal measure is unnecessary and explicitly excluded. Thus f2) at least one base layer is provided. Furthermore g1) the dispersion is an aqueous carbon suspension comprising at least one type of the carbon polymorphs of soot, graphite, activated carbon, tar, conductive black, furnace black, carbon black, lamp black, ESD black; g2) the dispersion is adjusted to a reactive pH; g3) the dispersion is a predominantly aqueous, freshly produced dispersion and g4) the dispersion is a reacting mixture. Thus the dispersion is reacting and being cured at the same time. Additionally h) the dispersion is cured by accompanying reaction, and i) the curing is conducted at room temperature and j) the curing is accelerated by contacting with at least one reagent. Thus a reaction within the dispersion is taking place while curing is additionally accelerated, solidifying at least an outer shell. As a result of these measures k) the obtained base layer being an oxidative or reductive layer, wherein reaction conditions are stored in solid solution.

In a preferred embodiment a dispersion is printed into an area and cured , the dispersion being a predominantly aqueous carbon suspension comprising at least microscale graphite with an amorphous carbon component and optionally up to 49% by weight of additions of related carbon polymorphs including soot, activated carbon, tar, conductive black, furnace black, carbon black, lamp black, ESD black, is admixed with at least one metal powder, which is no more than a microscale powder, of a base-soluble industrial metal comprising at least aluminum and/or iron. The suspension is then adjusted to a reactive pH greater than 7 and the metals are at least partly dissolved. The reductive base layer thus produced is applied and subjected to preliminary curing at least to form the stabilizing marginal shell, wherein the suspension applied in a thin layer is cured at least by accompanying UV exposure. Subsequently, for preferred production of an additional conductive electrotechnical thin layer, a fresh dispersion, having a low sulfuric acid content, of a metal, preferably copper, is provided on the reductive base layer and complete curing is conducted at room temperature, the curing being accelerated by the reductive deposition within 5 minutes with deposition of a metal layer in the micrometer range. Preferably integrated into the printing machine process, the metal layer can be obtained in less than 30 seconds in a continuous production cycle.

Advantageously, the electrotechnical thin layer sequence thus produced can be used as a solderable, printable metal layer, more preferably as a thin-layer heater. More preferably, contacting of the double layer by established soldering processes allows application of helpful and/or necessary contacts and/or circuits, which enables a multitude of electrotechnical thin layer products at extremely low cost. With production costs in the range from 1 to 10 Euros per square meter for the double layer flexibly supported on film or paper, the invention offers considerable potential for creation of value in the advantageous double layer combination, consisting of the base layer and a subsequent layer.

DESCRIPTION OF THE INVENTION AND ADVANTAGEOUS FEATURES

The invention provides a industrial-scale room temperature method of producing electrotechnical thin layers, by providing electrically conductive and/or semiconductive, inorganic agglomerates in a dispersion over an area and curing them to form a layer according to claim 1.

Industrial processing directs this method at established, large-scale printing machines; established business-machines of such nature like a roll-to-roll printer for labels provide products in the area of one to 150 square meters per minute and can be operated continuously with a staff of less than 10 people.

The room temperature method is directed at producing inorganic, electrotechnical thin layers;

‚inorganic' directs the functional compounds at compositions without organic, carbon-based molecules or sensitizers, that are prone to premature detoriation within months; ‚thin layers' are layers of micormeter scale, i. e. being thinner than a millimeter but thicker than a nanometer.

The method prints a1) electrically conductive inorganic agglomerates and/or a2) electrically semiconductive inorganic agglomerates b) in an industrial printing machine c) as a dispersion d) into predefined regions within an area e) of a flexible carrier.

‚conductive' and ‚semiconductive' designating the general, electrical property of each agglomerate; while conductive materials are known to have a resistivity with a posititve temperature coefficient, semiconductive materials are known to have a negative temperature coefficient; combinations of the two groups of materials can be set to specific properties of conductivity respectively.

Within the method f1) via curing the printed dispersion is effected to form at least a stabilizing marginal shell providing f2) at least one base layer. Combinations of layers to provide a base layer-series are possible.

Within the method to provide a base layer
g1) the dispersion is an aqueous carbon suspension comprising at least one type of the carbon polymorphs of soot, graphite, activated carbon, tar, conductive black, furnace black, carbon black, lamp black, ESD black
g2) the dispersion is adjusted to a reactive pH
g3) the dispersion is a predominantly aqueous, freshly produced dispersion
g4) the dispersion is a reacting mixture;
preferably oils and volatile, organic solvents are completely excluded, rendering the dispersion a purely aqueous system that is especially easy and safe to handle.

Within the method the fresh, reacting dispersion h) is cured by accompanying reaction, i.e. while a reaction is taking place within the dispersion an additional reaction enforces the predescribed curing. In detail i) the curing is conducted at room temperature, i.e. the reactions are carried out with kinetic control, and j) the curing is accelerated by contacting with at least one reagent. Such results in interruption of a first reaction within the dispersion by curing, which is enforced with a second, accompanying reaction. Thus k) the obtained base layer being an oxidative or reductive layer, wherein reaction conditions are stored in solid solution within the graphite.

The method is preferably characterized in that a PV layer sequence is formed. ‚PV' directing this layer sequence at ‚photo voltaic' layer sequences. Examples for compounds exhibiting the PV-effect, i.e. PV-sequences obtainable via metal layers combined with oxides, are long-known, for example from U.S. Pat. No. 1,640,335 A or from GB 360,391 A; in the present case such a layer-sequence is provided for the first time by room-temperature printing.

The method is preferably characterized in that the at least one layer is a layer comprising agglomerates of at least one chain-forming element, the chain-forming element being selected from the group consisting of boron, aluminum, gallium, indium, carbon, silicon, germanium, tin, lead, phosphorus, arsenic, antimony, sulfur, selenium, tellurium, bromine, iodine.

The method is preferably characterized in that at öeast one dispersion is an aqueous carbon suspension, the suspension comprising at least one type of the carbon polymorphs of soot, graphite, activated carbon, tar, conductive black, furnace black, carbon black, lamp black, ESD black, is adjusted to a reactive pH and is cured as an oxidative or reductive layer. Changing or adding the type of carbon polymorph alters the availability and capacity of the inorganic storage for the reductive or oxidative reaction conditions. Thus total capacity and speed of subsequently available reaction conditions can be optimised.

The method is preferably characterized in that the pH is adjusted by addition of at least one compound, the compound being selected from the group consisting of sodium hydroxide solution, potassium hydroxide solution, calcium hydroxide, barium hydroxide, ammonia, hydrochloric acid, sulfuric acid, nitric acid, hydrogen peroxide, phosphoric acid, ascorbic acid, citric acid, tartaric acid, carboxylic salts, carboxylic acids, amines, amino acids.

‚pH' being an established scale to specify the acidity or basicity of an aqueous system; puer water is neutral and has a pH of 7. Lower values correspond to systems being more acidic in nature, while higher values correspond to systems that are more basic or alkaline in nature. Combining systems of opposite pH, i.e. an acid with a base, results in an acid-base reaction.

The method is preferably characterized in that prior to printing a dispersion is obtained from a free-flowing mixture or solution, which is admixed with at least one metal from the group consisting of Li, Na, K, Be, Mg, Ca, Sr, Ba, B, Al, Ga, In, Tl, Si, Ge, Sn, Pb, As, Sb, Se, Te, Ti, Zr, Cr, Mn, Fe, Co, Ni, Cu, Zn, Hg, Au, Ag, Pt, Pd, Cd, with at least partial dissolution of the metal at an appropriate pH setting.

The method is preferably characterized in that a disperion obtained from a free-flowing mixture or solution, which is applied in a thin layer and finally cured by accompanying reaction, is assisted in curing by at least one measure, said at least one measure being selected from the group consisting of UV exposure, contacting with CO2, contacting with acidic gases, contacting with basic gases, contacting with oxidative gases, contacting with reducing gases, contacting with acid chlorides, contacting with urea solutions, contacting with metal oxide dispersion, contacting with metal carbonyls, contacting with metal complexes, contacting with metal compounds, contacting with metal salts.

Preference is given to a room temperature method according to the invention, wherein in additional, more specific detail electrically conductive and/or semiconductive, inorganic agglomerates in a dispersion are provided over an area and cured to form a layer,
  the curing is conducted at room temperature,
  the curing is accelerated by contacting with at least one reagent,
  the at least one base layer applied is a layer including agglomerates of at least one chain-forming element, the chain-forming element consisting of carbon, in which case
  the base layer as a predominantly aqueous carbon suspension,
  comprising at least microscale graphite with an amorphous carbon component and optionally up to 49% of additions of soot, activated carbon, tar, conductive black, furnace black, carbon black, lamp black, ESD black,
  is admixed with at least one metal powder, which is no more than a microscale powder, of a base-soluble metal, preferably of at least one metal from the group consisting of silicon, aluminum, gallium, indium, magnesium, calcium, barium, iron, cobalt, nickel, copper, zinc, more preferably silicon, aluminum and iron,
  the suspension is adjusted to an alkaline reactive pH greater than 7 and applied as a reductive layer and is subjected to preliminary curing at least to form a stabilizing marginal shell, wherein
  the suspension applied in a thin layer is cured at least by accompanying UV exposure.

The method is preferably characterized in that, at room temperature, for production of a conductive electrotechnical thin layer, wherein in additional, more specific detail an inorganic agglomerate in a dispersion is provided over an area and cured to form a layer, wherein
  a dispersion of a metal or a metal compound
  is provided on a reductive or oxidative base layer,
  the curing is conducted at room temperature, wherein
  the curing is accelerated by contacting with the at least one metal compound to deposit the metal or a metal oxide.

The method is preferably characterized in that in additional detail a base layer is provided in the form of a basic reductive layer comprising carbon, silicon, aluminum and iron.

The method is preferably characterized in that a dispersion for depositing an additional layer is an aqueous, slightly acidic copper solution, preferably a fresh, slightly acidic copper sulfate solution, which is printed onto the base layer with deposition of a copper layer.

The method is preferably characterized in that a metal layer of thickness up to 100 micrometers, preferably 0.5 to 80 micrometers, more preferably 3±2.5 micrometers, is deposited within not more than 5 minutes, preferably 1 to 2 minutes, more preferably within 30 seconds, within the printing process.

The method is preferably characterized in that a copper layer of thickness at least 0.5 micrometer with a conductivity around 100 ohms per centimeter, preferably of 0.5 to 10 ohms per centimeter, more preferably of 2±1.5 ohms per centimeter, is deposited.

The method is preferably characterized in that a further electrotechnical layer is deposited or formed atop the copper layer.

The method is preferably characterized in that a cover layer is applied and cured in defined regions atop a base layer and then a metal layer is formed as electrode layer in the regions that are still exposed.

The method is preferably characterized in that a base layer is electrostatically charged in a preparatory measure, preferably electrostatically charged in frictional contact with a polymer layer, more preferably electrostatically charged in frictional contact with a nylon brush roll.

Preference is given to use of an electrotechnical thin layer sequence obtained by the method of the invention, wherein the electrotechnical thin layer sequence is usable as solderable metal layer, conductor layer of an integrated circuit, resistance layer of a circuit, semiconductor layer, resistive sensor, capacitative sensor, moisture sensor, photoresist, sensor for oxidizing/reducing gases, capacitor, ferroelectrically active layer, diode, thin-layer resistance heater, transistor, field-effect transistor, bipolar transistor, quantitative photocell, photovoltaic layer sequence, touch sensor.

The thin layer sequence is preferably obtained by the method of the invention as an electrotechnical double layer, preferably thin-layer heater, having a cured basic reductive base layer atop an optional carrier, comprising
  carbon in the form of graphite and optionally up to 49% of further carbon polymorphs and/or carbon products,
  at least partly dissolved iron and/or aluminum of purity 96%, with 4% typical impurities such as silicon, boron, aluminum, phosphorus, magnesium, calcium, zinc,
  cured waterglass,
  metal silicates; and
  a metal layer reductively deposited thereon, preferably composed of copper obtained via a printed, acidic copper sulfate solution, in which case
  the metal layer has a metallic conductivity of 2.5±2.475 ohms per centimeter,
  and optionally, preferably in the case of copper layers,
  the double layer has a diode Zener voltage preferably in the region of 2.7±1 volts,
  the double layer has a capacitance preferably in the region of 40±39.98 microfarads, more preferably with up to 25% of the resistance across the double layer being purely of capacitative nature and making no contribution to the impedance at high frequency.

BRIEF DESCRIPTION OF THE FIGURES

The figures illustrate, with reference to diagrams.

DETAILED ELUCIDATION OF THE INVENTION WITH REFERENCE TO WORKING EXAMPLES

Figure 1:
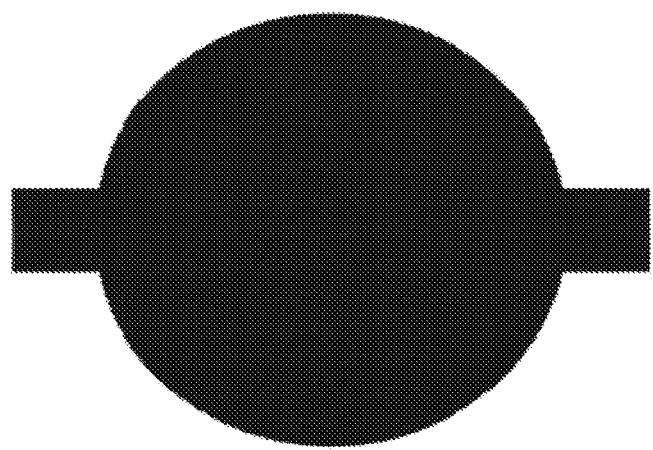
FIG. 1: an advantageous embodiment, shown in top view, of a preparatively reductively deposited and at least partly cured base layer.

Example 1: In an advantageous embodiment, and aqueous graphite dispersion was provided. In this dispersion, the microscale graphite contained a proportion of up to 49% of further carbon products such as amorphous graphite, activated carbon, conductive black, soot, lubricating graphite with oil residues/soot components and/or tar components. A microscale metal powder mixture of industrial aluminum and industrial iron was mixed into the aqueous graphite dispersion at around 50 percent by weight. The pH was adjusted to from 12 to 14 with partial dissolution of the metal powder, and the reacting mixture was homogenized in a cooled stirrer system, optionally adjusted in terms of flowability with silica, and printed onto a flexible paper sheet by means of a roll or screen system in predefined regions as illustrated in FIG. 1 and subjected to at least partial preliminary curing within up to 10 seconds—optionally with UV exposure. Pull-out characteristics, flowability and homogeneity can be adjusted via modifiers and auxiliaries such as emulsifiers, defoamers, thixotropic agents, basic buffer systems, adhesion promoters with siloxane copolymer, especially perpolymerized siloxane copolymers.

Figure 2:
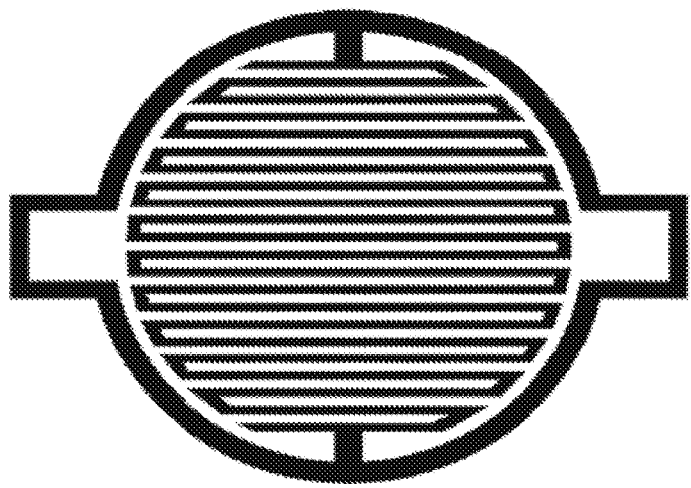
FIG. 2: an advantageous embodiment, shown in top view, of a covering layer which prevents the formation of a metal layer in the dark-colored regions.

The base layer obtained, in the case of pure graphite, has conductivities in the range from mega- to teraohms per centimeter; additions of conductive black, optionally in combination with conductive metal oxides and/or established electrolytes, are able to lower the conductivity by several orders of magnitude to the kiloohm range. According to the planned use as an AC or DC heating layer, the resistance can be set at an extremely high level (for AC) or else at a low level (for DC). In each case, the layer that has been rendered reductive and basic is found to be usable advantageously as base layer for a metallically conductive layer. After application of a cover layer according to FIG. 2, in the regions outlined in white in FIG. 2, it is possible by contacting with a freshly produced copper solution with a low sulfuric acid content to generate a highly conductive metal layer of a few micrometers in thickness within seconds to minutes. The copper layer obtained in the form of globular agglomerates, after 30 seconds to a few minutes, has a thickness of micrometers, adheres firmly and durably on the base layer and has conductivities of 0.05 to 5 ohms per centimeter. Additional contacts and/or circuits can be applied to the finally dried and rinsed copper layer by conventional solder bonding. The inventors assume that the freshly reductive layer can be a reasonable explanation for the rapid copper-plating: by virtue of the graphite, the reducing conditions are stored in solid solution and can actively and effectively accelerate the copper-plating during the final curing. Copper layers in the micrometer range can thus be produced within seconds, which is otherwise possible only with deposition rates of micrometers per hour in alternative chemical methods.

Comparative Measurements

Example 2: A base layer composition as predescribed in Example 1 was printed onto a glass carrier at 100 micrometers thickness on an industrial printing machine; residual metal content and morphology of printed layers was verified via rooster electron microscope with attached EDX-elemental anlysis. Metal was selected from the group consisting of technical grade powder of at least one of the metals Fe, Si, Al. Subsequently acidic copper sulfate solution was printed onto said base-layer, creating a metal-layer atop the base-layer of up to 20 microns.

Comparative example C1: Silicic acid was mixed with the same type of graphite and metal-powder and pH was adjusted to the slightly acidic pH needed for subsequent electroplating. Slurry was deposited on a glass carrier in equal thickness of 100 microns. The layer was cured/hardened. Subsequently carrier was immersed in a slightly acidic electroplating solution and copper was deposited with a continuous current in the mA-range. A copper-layer of 20 microns was obtained within 10 minutes.

Comparative example C2: A graphite-metal-mixture was prepared and processed as in C1, setting the pH to neutral conditions required for subsequent deposition of a conductive, printable copper ink; the copper ink requires a neutral pH, UV to be cured and contains copper nano-particles coated with amines, cellulose to promote initial film formation and an organic prepolymer binder, which can be activated with UV-irradiation. A 20 microns thick layer was deposited using an industrial inkjet-printer with UV-hardening tunnel according to the ink's material data sheet. Solvents and volatiles had to be removed with a fume hood.

Rooster-electron microscope and further tests confirmed the layers to be fundamentally different:

Example 2 showed a dendrite-like net of thin to thick copper vines with integrated, small copper crystals; the vines were clinging to and into the base layer; inventors consider said morphology to be a hallmark of a reactive room-temperature method, which alters concentrations of small, defined volume during rapid reaction under kinetic control. Directly after printing, i.e. when the printed glass carrier exited the printing machine, the metal layer could be connected to wires via soldering. The solder-joint was very stable. Excessive force resulted in the respective cable ripping out parts of the printed double layer from the glass carrier.

Printing the example-2-system onto mica-paper provides a thin-layer combination, that can be bent (180° semicircle with 4 cm diameter) repeatedly (500 times) without change in electrical resistivity or stability of soldered joints/connectors. A likewise printed heater showed the same properties and morphologies.

Comparative example C1 showed a leaf-like surface of copper-flakes on a continuous copper layer consisting of bulky copper crystals; the leaf-layer was still rich with organic additives from the electroplating solution and needed drying at 120° C. in a fume hood to safely remove the solvents and sinter the ‚leaves' into the copper layer; soldering was possible only after sintering the layer at the raised temperature.

The sintered copper layer is good in internal bulk stability but poor in adhesion to the base layer; excessive force resulted in the soldered wire to rip off the metal layer from the base layer, indicating a poor adhesion of the copper-layer to the base layer. Parallel experiments using mica-paper as a carrier corroborated this: Flexing a likewise coated and sintered mica-paper repeatedly to a 180° semicircle with 4 cm diameter resulted in the copper-layer coming off the base layer after 20 to 30 flexings.

Comparative example C2: The printed copper ink is dry to the touch after UV-hardening, but does not allow soldering; elevated temperatures or reduced pressure results in residual solvents gassing out. After concluding removal of said solvents at 120° C. (or 0/01 bar for 30 minutes), examination via rooster electron microscope showed a homogeneous composite layer containing round/uneven metal grains of up to 0.2 microns size within a matrix of polymer and cellulose. In case of thermal removal of volatiles some of the grains had formed larger, crystalline particles within the composite matrix. However the composite matrix still showed traces of amines and VOC's (volatile organic components) in the elemental analysis. Due to the organic remains within the composite structure this metal layer can not be soldered at all and can not be sealed into gas-tight pouches at elevated temperatures.

Claimed method successfully provides fast, simple printing of an inorganic, electrotechnical layers on industrial scale. Established systems take much longer in production, contain organic components and necessitate the use of fume-hoods to safely remove VOC's.

INDUSTRIAL APPLICABILITY

Electrotechnical thin layers usable as heating resistance and/or substrate for conductor layers are produced at high cost and extremely slowly in the established methods. Simple, industrial-scale methods that provide sufficient speed at room temperature are not available.

This problem is solved by a room temperature printing process, wherein a redox-reactively deposited, graphite-containing base layer printed at room temperature is obtained, onto which a metal, by redox reaction during print, forms a metal layer in the micrometer scale within minutes to a few seconds in a corresponding manner.

The double layer thus obtainable in one printing process is highly flexible, allows soldering to copper layers, and can be used particularly advantageously as a thin-layer heater.

The invention claimed is:

1. A room temperature method of producing inorganic, electrotechnical thin layers, characterised in that by printing a1) electrically conductive inorganic agglomerates and/or a2) electrically semiconductive inorganic agglomerates b) in an industrial printing machine c) as a dispersion d) into predefined regions within an area e) of a flexible carrier and f1) via curing the printed dispersion to form at least a stabilizing marginal shell f2) at least one base layer is provided, wherein furthermore
    g1) the dispersion is a predominantly aqueous carbon suspension comprising at least microscale graphite with amorphous carbon component and up to 49% of additions of soot activated carbon, tar, conductive black, furnace black, carbon black, lamp black, ESD black, wherein the dispersion is admixed, with at least one microscale metal powder of a base-soluble metal selected from the group consisting of silicon, aluminum, gallium, indium, magnesium, calcium, barium, iron, cobalt, nickel, copper, and zinc prior to application,
    g2) the dispersion is adjusted to a reactive pH of 12-14,
    g3) the dispersion is a predominantly aqueous, alkaline dispersion,
    g4) the dispersion is a reacting mixture,
    h) the dispersion is cured by accompanying reaction, and
    i) the curing is conducted at room temperature and j) the curing is accelerated by contacting with at least one reagent, and
    k) the obtained base layer is a basic reductive layer, wherein reductive, alkaline conditions are stored within the graphite in solid solution.

2. The method as claimed in claim 1, wherein a PV layer sequence is formed as combination of several layers, including the base layer.

3. The method as claimed in claim 1, wherein the at least one base layer applied is a layer further comprising agglomerates of at least one chain-forming element, the chain-forming element being selected from the group consisting of boron, aluminum, gallium, indium, carbon, silicon, germanium, tin, lead, phosphorus, arsenic, antimony, sulfur, selenium, tellurium, bromine, and iodine.

4. The method as claimed in claim 1, wherein the accompanying reaction is promoted by at least one measure, said at least one measure being selected from the group consisting of UV exposure, contacting with CO2, contacting with acidic gases, contacting with basic gases, contacting with oxidative gases, contacting with reducing gases, contacting with acid chlorides, contacting with urea solutions, contacting with metal oxide dispersion, contacting with metal carbonyls, contacting with metal complexes, contacting with metal compounds, and contacting with metal salts.

5. The room temperature method comprising the base layer according to claim 1, wherein
    the at least one base layer including agglomerates of at least one chain-forming element, the chain-forming element consisting of carbon, wherein furthermore
    the least one microscale metal powder of a base-soluble metal is selected from the group consisting of silicon, aluminum and iron,
    the dispersion is applied as a reductive layer and is subjected to preliminary curing at least to form a stabilizing marginal shell, wherein the dispersion applied in a thin layer is cured at least by accompanying UV exposure.

6. The method as claimed in claim 1, wherein, for production of an additional, conductive, electrotechnical thin layer,
    I1) a second dispersion of a metal or a metal compound
    I2) is provided on the reductive base layer,
    I3) the curing of the additional layer is conducted at room temperature, wherein
    I4) the curing is accelerated by contacting with the at least one metal compound to deposit a metal or a metal oxide.

7. The method as claimed in claim 6, wherein the base layer is provided in the form of a basic reductive layer comprising carbon, silicon, aluminum and iron.

8. The method as claimed in claim 6, wherein the second dispersion used is an aqueous, acidic copper sulfate solution.

9. The method as claimed in claim 6, wherein a metal layer of thickness 0.5 to 80 micrometers is deposited within 30 seconds.

10. The method as claimed in claim 6, wherein in a second step an additional cover layer is applied and cured in defined regions atop the base layer and then in a third step a metal layer is formed as electrode layer in the regions that are still exposed.

* * * * *